United States Patent
Raffo et al.

(10) Patent No.: US 10,656,786 B2
(45) Date of Patent: May 19, 2020

(54) INTERACTIVE GRAPHICAL USER INTERFACE TO GUIDE CONFIGURATION OF AN APPLICATION

(71) Applicant: Oracle International Corporation, Redwood Shores, CA (US)

(72) Inventors: Louise A. Raffo, Reading (GB); Peter J. May, Bracknell (GB); Tracey L. H. Mumford, Woodley (GB); Jasbir Grewal, London (GB); Paolo Zulato, Reading (GB)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/232,843

(22) Filed: Dec. 26, 2018

(65) Prior Publication Data
US 2019/0146656 A1    May 16, 2019

Related U.S. Application Data

(63) Continuation of application No. 14/991,385, filed on Jan. 8, 2016, now Pat. No. 10,216,360.

(51) Int. Cl.
| | |
|---|---|
| *G06F 3/048* | (2013.01) |
| *G06F 3/0481* | (2013.01) |
| *G06F 3/0482* | (2013.01) |
| *G06F 3/0484* | (2013.01) |
| *G06F 3/0486* | (2013.01) |

(Continued)

(52) U.S. Cl.
CPC ........ *G06F 3/04817* (2013.01); *G06F 3/0482* (2013.01); *G06F 3/0486* (2013.01); *G06F 3/04842* (2013.01); *G06F 3/04845* (2013.01); *G06F 3/04847* (2013.01); *G06F 8/34* (2013.01); *G06F 9/44505* (2013.01); *G06F 9/453* (2018.02)

(58) Field of Classification Search
CPC ............................. G06F 3/04817; G06F 9/453
USPC ............... 715/713, 779, 781, 825, 834, 835, 715/853–855
See application file for complete search history.

(56) References Cited

U.S. PATENT DOCUMENTS

| | | |
|---|---|---|
| 2008/0040254 A1 | 2/2008 | Waelbroeck et al. |
| 2010/0306195 A1 | 12/2010 | Wagener et al. |
| 2016/0179339 A1 | 6/2016 | Ponce et al. |

OTHER PUBLICATIONS

Oragle, "Oracle Business Process Management Suite", Oracle Data Sheet, Copyright 2014, 4 pages.

(Continued)

*Primary Examiner* — Andrey Belousov
(74) *Attorney, Agent, or Firm* — Invoke

(57) ABSTRACT

An interactive graphical user interface (GUI) to guide configuration of an application is disclosed. A GUI receives user input comprising dragging and dropping an icon representing a particular configurable option into a configuration region of the GUI. The drag-and-drop user input indicates a selection of the particular configurable option. The GUI receives, through one or more interface elements, user input configuring the particular configurable option. The user input provides a context for which additional configurable options are presented to the user. Based on the context, a configuration engine selects only a subset of configurable options that are associated with the particular configurable option for presentation to a user. A GUI displays icons representing the selected subset of configurable options, but not icons representing the non-selected subset of configurable options.

20 Claims, 11 Drawing Sheets

(51) Int. Cl.
*G06F 8/34* (2018.01)
*G06F 9/445* (2018.01)
*G06F 9/451* (2018.01)

(56) References Cited

OTHER PUBLICATIONS

Oragle, "Oracle BPEL Process Manager", Online available at: <http://www.oracle.com/technetwork/middleware/bpe/overview/index.html>, retrieved on Sep. 16, 2015, 3 pages.

US 10,656,786 B2

INTERACTIVE GRAPHICAL USER INTERFACE TO GUIDE CONFIGURATION OF AN APPLICATION

INCORPORATION BY REFERENCE

The following application is hereby incorporated by reference: application Ser. No. 14/991,385 filed on Jan. 8, 2016. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to a graphical user interface. In particular, the present disclosure relates to an interactive graphical user interface to guide configuration of an application.

BACKGROUND

Various applications include configurable options that may be set by a user. Depending on the application, the configurable options may be numerous and complex. As an example, an application may be used to institute a benefits program for the employees of a company or organization. A user (such as a human resources administrator and/or an application implementation consultant) may need to enter a vast amount of information including, for example, a scope of the benefits program (such as duration and geographical coverage), enrollment rules, eligibility criteria, rates and costs, life events that trigger certain rules, benefit plans, and benefit options. The user may need to navigate through multiple menus and pages in order to configure the benefits program.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

One or more embodiments include presenting configurable options at a graphical user interface (GUI) based on a context provided by prior configurations of other configurable options. A GUI receives user input comprising dragging an icon representing a particular configurable option into a particular region of the GUI (also referred to herein as a "configuration region" of the GUI). The GUI receives, through one or more interface elements, user input configuring the particular configurable option. The user selection and/or configuration of the particular configurable option provides a context for which additional configurable options are to be presented to the user. Based on the context, a configuration engine selects only a subset of configurable options that are associated with the particular configurable option for presentation to a user. A GUI displays icons representing the selected subset of configurable options, but not icons representing the non-selected subset of configurable options.

One or more embodiments include illustrating a completion of a configuration of a set of configurable options at a GUI. The GUI receives user input configuring a set of configurable options that are represented by a set of icons displayed at a GUI. A configuration engine determines that a configuration of the set of configurable options is complete. The GUI displays a modified set of icons to illustrate that the configuration of the set of configurable options is complete. The set of icons may be modified to have, for example, a different color, a different shape, a particular mark, tag, or annotation, a different image, and/or a particular animation.

2. Architectural Overview

Figure 1A:
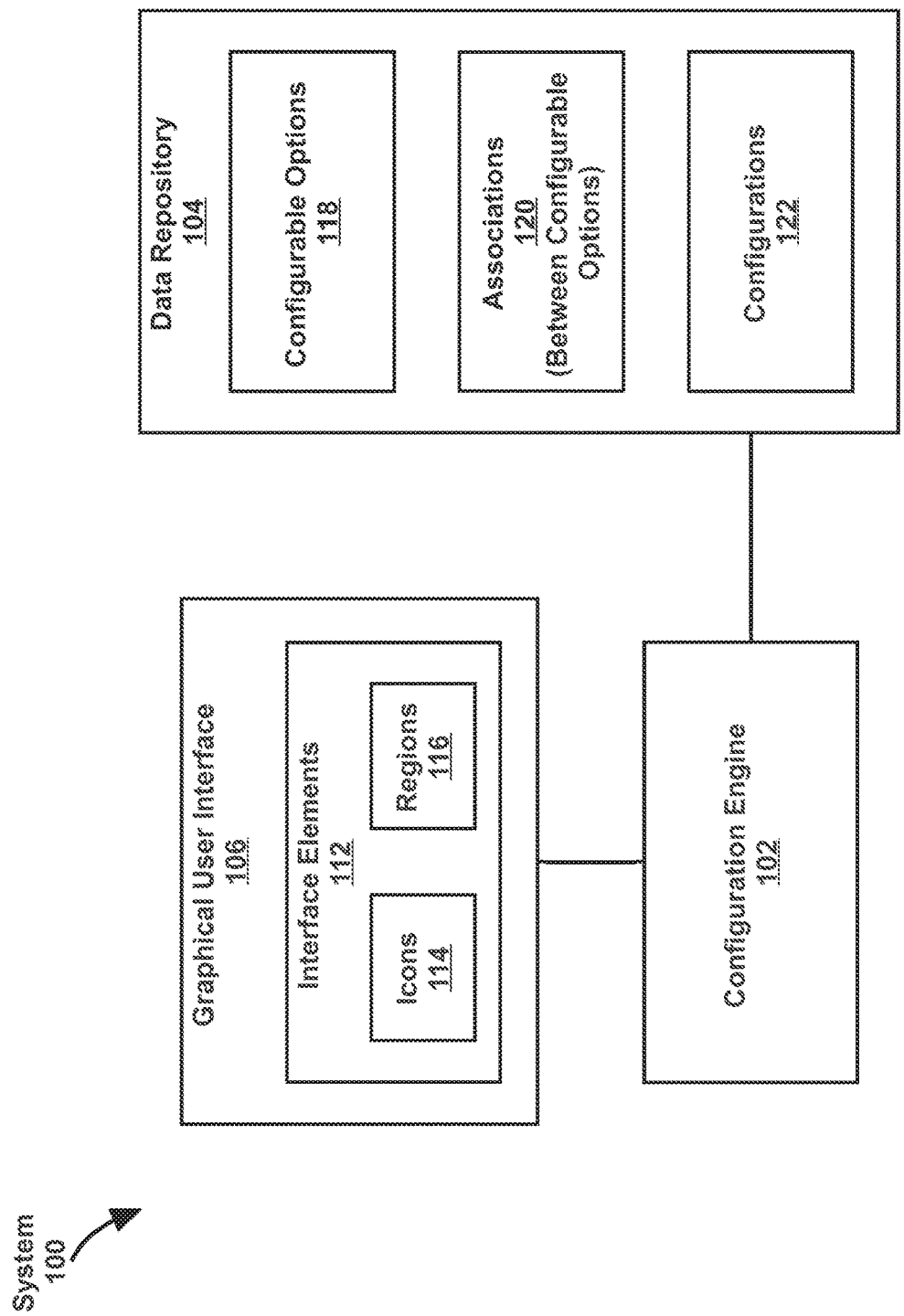
FIG. 1A illustrates a system in accordance with one or more embodiments.

FIG. 1 illustrates a system 100 in accordance with one or more embodiments. As illustrated in FIG. 1, system 100 includes a configuration engine 102, a data repository 104, and a graphical user interface (GUI) 106. In one or more embodiments, system 100 may include more or fewer components than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In one or more embodiments, data repository 104 is any type of storage unit and/or device (e.g., a file system, database, collection of tables, or any other storage mechanism) for storing data. Further, data repository 104 may include multiple different storage units and/or devices. The multiple different storage units and/or devices may or may not be of the same type or located at the same physical site. Further, data repository 104 may be implemented or may execute on the same computing system as configuration engine 102. Alternatively or additionally, data repository 104 may be implemented or executed on a separate computing system than configuration engine 102. Data repository 104 may be connected to configuration engine 102 via a direct connection or via a network.

Data sets describing configurable options 118, associations 120 between configurable options, and configurations 122 may be implemented across any of components within system 100. However, these data sets are illustrated within data repository 104 for purposes of clarity and explanation.

In one or more embodiments, configurable option 118 represents a set of one or more attributes that may be configured by a user in an application. As an example, an administrator may use an application to configure a benefits program to be provided to employees of a company. A particular configurable option may be a health insurance plan. Attributes of the health insurance plan to be configured may include a name of the plan, and a currency to be used by the plan. Another configurable option may be a dental insurance plan. Yet another configurable option may be a vision insurance plan.

As another example, a customer may use an application to configure a vehicle to be purchased by the customer. A particular configurable option may be the vehicle itself. Attributes of the vehicle to be configured may include a vehicle type (such as a sedan, a truck, or a motorcycle). Another configurable option may be the color of the vehicle. Yet another configurable option may be a sound system of the vehicle.

In one or more embodiments, association 120 between two or more configurable options indicates a logical relationship between the configurable options. Associations 120 are predefined in an application, such as during a set-up phase of configuration engine 102. After associations 120 are defined, associations 120 are stored at data repository 104 and thereafter applicable to the operations of configuration engine 102.

A hierarchy of associations between configurable options may be defined. The hierarchy includes multiple levels. Each level has one or more nodes. Nodes of different levels are linked by one or more branches. Each branch indicates a logical relationship between the linked nodes. A first node that is linked to a second node of a lower level of the hierarchy is referred to herein as a "child" of the second node. Conversely, the second node is referred to herein as a "parent" of the first node. A particular node is referred to herein as being "directly associated" with the particular node's children and the particular node's parent. A particular node is referred to herein as being "indirectly associated" with the particular node's descendants (except for the particular node's children) and the particular node's ancestors (except for the particular node's parent). A particular node is "associated with" all nodes with which the particular node is directly and/or indirectly associated.

Figure 1B:
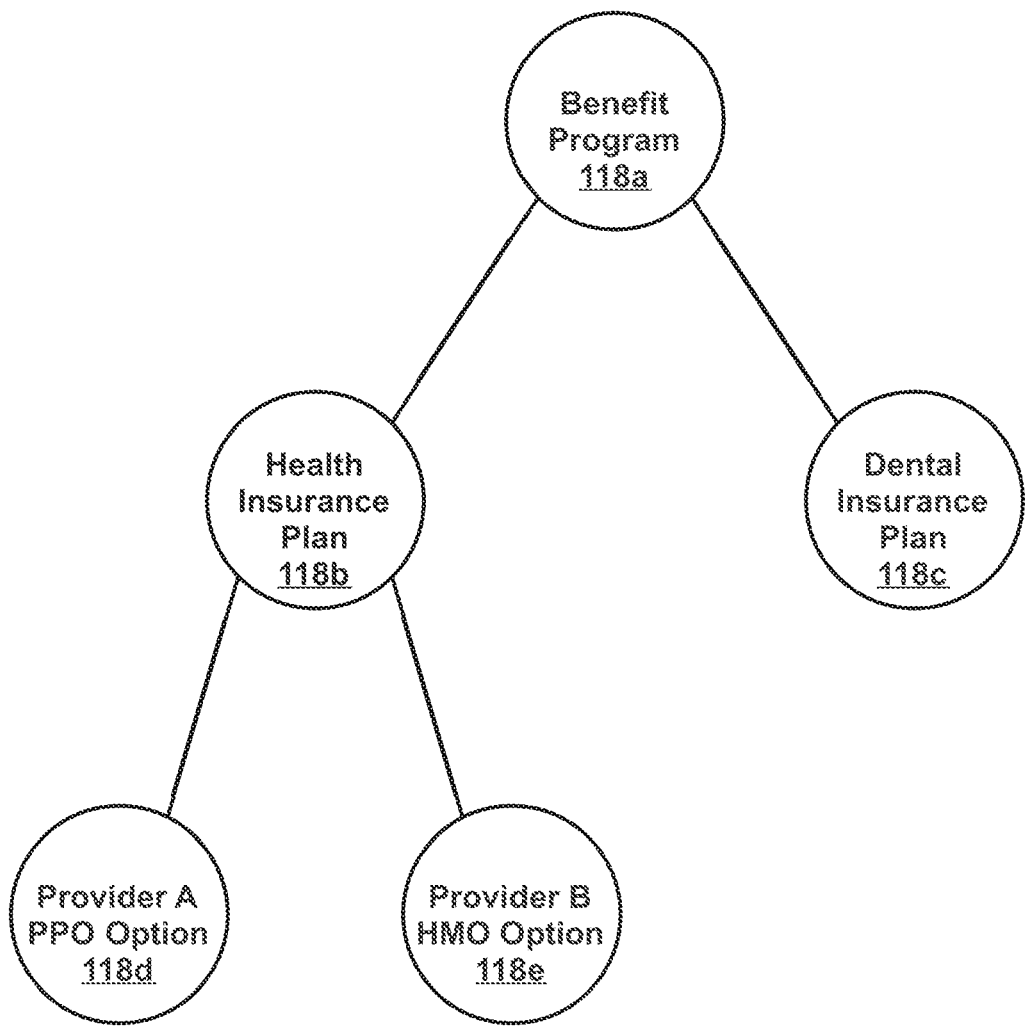
FIG. 1B illustrates an example of a hierarchy of associations between configurable options, in accordance with one or more embodiments.

FIG. 1B illustrates an example of a hierarchy of associations between configurable options, in accordance with one or more embodiments. As an example, an application may provide the following configurable options: Benefit Program 118*a*, Health Insurance Plan 118*b*, Dental Insurance Plan 118*c*, Provider A Preferred Provider Organization (PPO) Option 118*d*, and Provider B Health Maintenance Organization (HMO) Option 118*e*. A hierarchy of associations between the configurable options may be defined during a set-up phase of the application. The hierarchy may indicate that Benefit Program 118*a* is on a top level. Benefit Program 118*a* branches off to Health Insurance Plan 118*b* and Dental Insurance Plan 118*c*, which are on a second level. Health Insurance Plan 118*b* branches off to Provider A PPO Option 118*d* and Provider B HMO Option 118*e*, which are on a third level. In this example, Benefit Program 118*a* would be directly associated with Health Insurance Plan 118*b* and Dental Insurance Plan 118*c*. Benefit Program 118*a* would be indirectly associated with Provider A PPO Option 118*d* and Provider B HMO Option 118*e*. Moreover, Health Insurance Plan 118*b* would be associated with Benefit Program 118*a*, Provider A PPO Option 118*d*, and Provider B HMO Option 118*e*, but not Dental Insurance Plan 118*c*.

In one or more embodiments, configuration 122 includes one or more particular values specified by a user for configurable option 118. Specifying configuration 122 for a particular configurable option 118 may include configuring one or more attributes of the particular configurable option 118. As an example, a configurable option may be Benefits Program. An attribute of Benefits Program is an applicable time period for the program. A configuration of Benefits Program would specify that the applicable time period is, for example, Jan. 1 to Dec. 31, 2016.

In one or more embodiments, graphical user interface (GUI) 106 refers to hardware and/or software configured to facilitate communications between a user and configuration engine 102. GUI 106 is a type of interface that allows a user to interact with a computing system through graphical and/or visual interface elements 112 displayed at a display device. A display device displays a GUI by relying on cathode-ray tube (CRT) techniques, liquid crystal display (LCD) techniques, light-emitting diode (LED) techniques, and/or other display technologies. The user interacts with the computing system by manipulating interface elements 112 using a user input device. Examples of user input devices include a mouse, a trackball, and a keyboard.

In one or more embodiments, interface element 112 is an element that is rendered at GUI 106. Interface element 112 may be displayed with no functionality to accept user input. Alternatively, interface element 112 may be configured to accept user input. Examples of interface elements 112 include icons 114 and regions 116.

Icon 114 may be a graphical element, such as an image, that represents any object or thing. As an example, icon 114 represents configurable option 118. In some embodiments, icon 114 is interactive. A user uses a user input device to click on a particular icon 114 to trigger an action (such as opening of a new window, submission of user input, or performance of an operation). Additionally or alternatively, a user uses a user input device to drag-and-drop a particular icon 114 from one region 116 to another region 116 of GUI 106.

Region 116 may be a particular area of GUI 106 within which interface elements 112 having a common purpose or attribute are displayed. As an example, region 116 may be an area enclosing icons 114 that have been selected by a user. As another example, region 116 may be an area enclosing icons 114 that are available for selection by a user. As another example, region 116 may be an area enclosing interface elements 112 that accept particular user input from a user.

One or more regions 116 of a GUI may be referred to herein as a "configuration region." A configuration region is an area of the GUI enclosing icons 114 that have been selected by a user. A user selects a particular icon 114 by dragging the particular icon 114 into the configuration region.

In one or more embodiments, another example of an interface element 112 is fields (not shown). A field is a graphical element that accepts user input. Examples of fields include a text box, a dropdown menu, a date selector, a scroll bar, and a toggle. In other embodiments, additional or alternative interface elements 112 may be used.

In one or more embodiments, configuration engine 102 refers to hardware and/or software configured to perform operations described herein for displaying an interactive GUI to guide configuration of an application. Examples of operations for displaying an interactive GUI to guide configuration of an application are described below with reference to FIGS. 2 and 3.

Configuration engine 102 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a printer, a mobile handset, a smartphone, and a personal digital assistant ("PDA").

Figure 2:
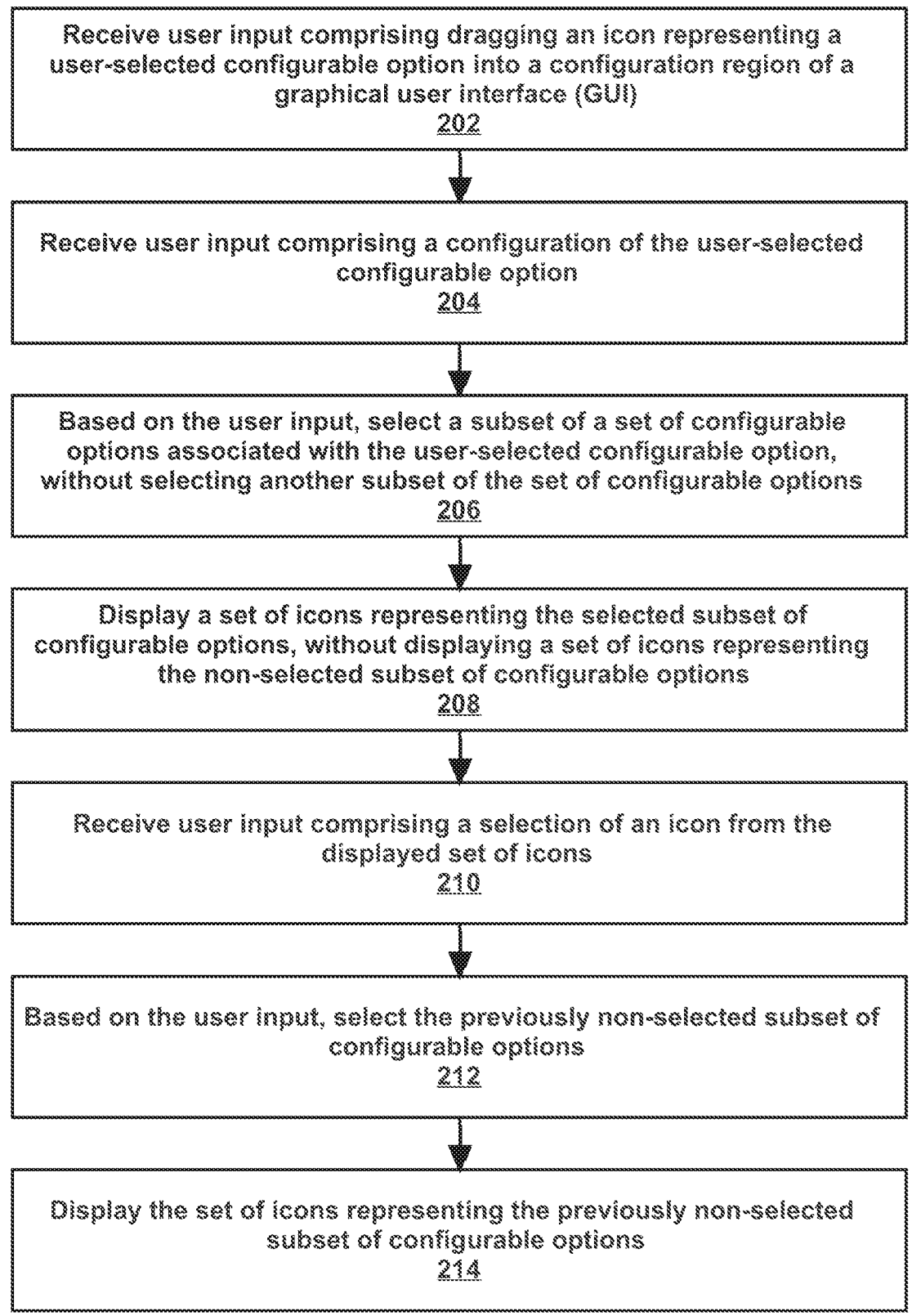
FIG. 2 illustrates an example set of operations for presenting configurable options at a graphical user interface based on a context of prior configurations, in accordance with one or more embodiments.

3. Presenting Configurable Options at a Graphical User Interface Based on a Context of Prior Configurations FIG. 2 illustrates an example set of operations for presenting configurable options at a graphical user interface (GUI) based on a context of prior configurations, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include receiving a user input comprising dragging an icon representing a user-selected configurable option into a configuration region of a GUI (Operation 202). The GUI displays one or more icons in a particular region of the GUI. A user uses a user input device to drag-and-drop the use-selected icon from the particular region to a configuration region of the GUI. The particular region is an area enclosing icons that are selectable by a user. The particular region may be, for example, a column displayed to a right-side or a left-side of the GUI. The configuration region is an area enclosing icons that have been selected by a user. The configuration region may be, for example, a central or main area of the GUI.

One or more embodiments include receiving a user input comprising a configuration of the user-selected configurable option (Operation 204). One or more interface elements, such as fields, accept user input comprising the configuration of the user-selected configurable option. The GUI displays the interface elements in response to the user input dragging the user-selected icon into the configuration region of the GUI. Alternatively, the GUI displays the interface elements in response to another user input clicking on the user-selected icon, after the user-selected icon was dragged into the configuration region of the GUI.

The interface elements displayed at the GUI may correspond to one or more attributes of the user-selected configurable option. As an example, the GUI may receive user input dragging an icon representing Benefits Program into a configuration region. An attribute of Benefits Program may be an applicable country of the Benefits Program. Upon the icon being dropped into the configuration region, the GUI may display a particular interface element corresponding to the attribute. The particular interface element may be a dropdown menu for selecting a country in which the Benefits Program is applicable.

A user may use a user input device to enter the configuration using the interface elements displayed at the GUI. The user may, for example, use a mouse to make a selection from a dropdown menu, or use a keyboard to enter text in a text field.

One or more embodiments include selecting a subset of a set of configurable options associated with the user-selected configurable option based on the user input received at Operation 202 and/or Operation 204. The remainder of the set of configurable options associated with the user-selected configurable option is not selected (Operation 206). A set of configurable options associated with the user-selected configurable option is identified from the associations that are stored in a data repository. The user input received at Operation 202 and/or Operation 204, comprising a selection and/or configuration of the user-selected configurable option, provides a context for selecting the subset of configurable options from the set of configurable options. The selected subset of configurable options include configurable options that are available for a user to configure based on the context. The non-selected subset of configurable options include configurable options that are not available for a user to configure based on the context.

A set of rules, conditions, and/or criteria specify which configurable options are available for a user to configure in a particular context. The set of rules, conditions, and/or criteria are stored at a data repository and implemented as if-then statements, case statements, tables, and/or other formats. As an example, Configuration Option B, Configurable Option C, and Configurable Option D may be associated with Configurable Option A. A configuration of Configurable Option A may provide a context for selecting a subset from Configurable Option B, Configurable Option C, and Configurable Option D. A particular rule may specify that if a particular configuration is received for Configurable Option A, then Configurable Option B and Configurable C are available for a user to configure. Based on the particular rule, Configurable Option B and Configurable Option C may be selected. Another rule may specify that if another configuration is received for Configurable Option A, then Configurable Option D is available for a user to configure. Based on the other rule, Configurable Option D may be selected.

A data repository may store a hierarchy of associations amongst configurable options. Based on the hierarchy, a particular configurable option may be directly or indirectly associated with the user-selected configurable option. The subset of configurable options that are selected based on the context may include configurable options that are directly and/or indirectly associated with the user-selected configurable option. The non-selected subset of configurable options may also include configurable options that are directly and/or indirectly associated with the user-selected configurable option.

As an example, a user may drag-and-drop an icon representing Vehicle into a configuration region of a GUI. A hierarchy of associations amongst configurable options may indicate that Vehicle is directly associated with: (a) Sound System, and (b) Truck Bed. The hierarchy may further indicate that Sound System is directly associated with: (c) Speakers. Based on the hierarchy, a set of configurable options associated with Vehicle include (a) Sound System, (b) Truck Bed, and (c) Speakers.

The user may provide a configuration for Vehicle, indicating that Vehicle is a sedan. Based on the user input indicating that Vehicle is a sedan, Sound System may be an available configurable option for the sedan. However, Truck Bed may not be an available configurable option for the sedan. Further, Speakers may also not be an available configurable option at this time, since Sound System has not yet been selected and configured.

A table may include a list of configurations for Vehicle (such as, sedan, truck, and van), and available configurable options corresponding to each configuration for the vehicle. The table may indicate that if Vehicle is configured as a sedan, Sound System is an available configurable option. The table may further indicate that Truck Bed and Speakers are not available configurable options. By looking up the table, Sound System would be included in a subset of configurable options that are selected based on the context. Truck Bed and Speakers would be included in a non-selected subset of configurable options.

In this example, the selected subset of configurable options would include a configurable option (Sound System) that is directly associated with Vehicle. The non-selected subset of configurable options would include a configurable option (Truck Bed) that is directly associated with Vehicle and a configurable option (Speakers) that is indirectly associated with Vehicle.

In an embodiment, the configuration engine determines that the selected set of configurable options are recommended and/or suggested configurable options. The configuration engine makes this determination based on the context provided by the user input received at Operation 202 and/or 204. The recommendations and/or suggestions reflect a set of best practices and/or typical practices in the given context. The recommendations and/or suggestions are determined using a set of rules, conditions, and/or criteria stored in a data repository.

As an example, a user may drag-and-drop an icon representing a Benefits Program into a configuration region of a GUI. The user may specify that the applicable country of the Benefits Program is the United States. Based on the user input indicating that the Benefits Program applies to the United States, a Health Insurance Plan may be suggested for a user to configure. Meanwhile, a Childcare Voucher may not be suggested for a user configure, since Childcare Vouchers are not common in the United States. A table may indicate the configurable options that are recommended for a user to configure for a Benefits Program that is in the United States. By looking up the table, Health Insurance Plan would be selected as a suggested configurable option, while Childcare Voucher would not be selected.

One or more embodiments include displaying a set of icons representing the selected subset of configurable options, while not displaying a set of icons representing the non-selected subset of configurable options (Operation 208). A configuration engine retrieves the set of icons representing the selected subset of configurable options from a data repository. Different icons may be rendered as different images. As an example, a particular configurable option may be a Health Insurance Plan, and another configurable option may be a Dental Insurance Plan. An icon representing the Health Insurance Plan may be an image of a stethoscope. An icon representing the Dental Insurance Plan may be an image of a tooth.

A GUI displays the set of icons representing the selected subset of configurable options in a particular region of the GUI that indicates that the set of icons are available for user selection. The set of icons are displayed in a region that is different from the configuration region of the GUI (where the user-selected icon was dragged into). A user may select one or more of the set of icons by dragging the icons into the configuration region of the GUI.

Additionally or alternatively, the GUI displays the set of icons representing the selected subset of configurable options in the configuration region of the GUI (where the user-selected icon was dragged into). The set of icons are displayed in the configuration region to indicate that the selected subset of configurable options are recommended and/or suggested for a user to configure. A user may remove a particular icon from the configuration region of the GUI to indicate the user is not configuring the configurable option represented by the particular icon. Additionally or alternatively, a user may drag additional icons into the configuration region of the GUI.

In an embodiment, the GUI displays a visualization of associations between the user-selected configurable option and the selected subset of configurable options concurrently with (a) the icon representing the user-selected configurable option and (b) the set of icons representing the selected subset of configurable options. The GUI displays the visualization of associations in the configuration region. As an example, a data repository may store a hierarchy of associations amongst configurable options. A visualization of the hierarchy of associations may be presented as a tree graph. The tree graph may include multiple levels, each representing a level of the hierarchy. One or more icons, representing different configurable options, may be displayed at each level of the tree graph. Lines (also referred to as "branches") may be displayed connecting icons of adjacent levels, to indicate a direct association between the configurable options represented by the connected icons.

As another example, a data repository may store a hierarchy of associations amongst configurable options. A visualization of the hierarchy of associations may be presented as a spokes-and-wheels graph. The spokes-and-wheels graph may include multiple concentric circles, each of increasing radii. Each concentric circle may represent a different level of the hierarchy. One or more icons, representing different configurable options, may be displayed on each concentric circle. Lines (also referred to as "spokes") may be displayed connecting icons of adjacent circles, to indicate a direct association between the configurable options represented by the connected icons.

The GUI does not display a set of icons representing the non-selected subset of configurable options. However, the set of icons representing the non-selected subset of configurable options may or may not be subsequently displayed, depending on a context provided by additional user input. The display of the set of icons representing the non-selected subset of configurable options is described below with reference to Operations 210-214.

One or more embodiments include receiving a user input comprising a selection of an icon from the displayed set of icons (which represent the selected subset of configurable options) (Operation 210). The user input may comprise dragging the icon into the configuration region of the GUI. Alternatively, the user input may comprise clicking on the icon. The selection of the icon represents a selection of the configurable option represented by the icon.

One or more embodiments include selecting the subset of configurable options that were not selected at Operation 208, based on the user input received at Operation 210. The subset of configurable options that were not selected at Operation 208 is referred to herein as the "previously non-selected subset of configurable options" (Operation 212). The user input received at Operation 210 provides additional context for selecting additional configurable options, from the set of configurable options associated with the user-selected configurable option (selected at Operation 202), that are available for a user to configure. While the previously non-selected subset of configurable options were not available for a user to configure based on the user input received at Operation 202 and/or Operation 204, the previously non-selected subset of configurable options become available for a user to configure based on the user input subsequently received at Operation 210. The configurable options that are available for a user to configure based on the user input received at Operation 210 are determined using a set of rules, conditions, and/or criteria stored in a data repository.

As an example, a Benefits Program may be associated with the following configurable options: (a) Health Insurance Plan and (b) Provider A PPO Option. Based on a configuration of the Benefits Program, Health Insurance Plan may be a configurable option that is available for a user to configure. A GUI may display an icon representing Health Insurance Plan. However, Provider A Option may not be a configurable option that is available for a user to configure until further information is received. In particular, whether Provider A Option is an available configurable option depends on whether Health Insurance Plan is selected by a user. If Health Insurance Plan is selected, Provider A Option may be available for a user to configure. If Health Insurance Plan is not selected, Provider A Option may not be available. Since the availability of Provider A Option as a configurable option cannot be determined at this time, Provider A Option would not be selected at this time.

Continuing this example, the icon representing the Health Insurance Plan may be subsequently dragged into a configuration region of the GUI, indicating that Health Insurance Plan has been selected by a user. Based on the user's selection of Health Insurance Plan, Provider A Option may be available for a user to configure. Provider A Option would be selected at this time.

One or more embodiments include displaying the set of icons representing the previously non-selected subset of configurable options (Operation 214). A configuration engine retrieves the set of icons representing the previously non-selected subset of configurable options from a data repository. Different icons may be rendered as different images. The GUI may display the set of icons in the configuration region, to indicate that the previously non-selected subset of configurable options are recommended and/or suggested for a user to configure. Additionally or alternatively, the GUI may display the set of icons in another region, to indicate that the previously non-selected subset of configurable options are available for a user to configure.

Figure 3:
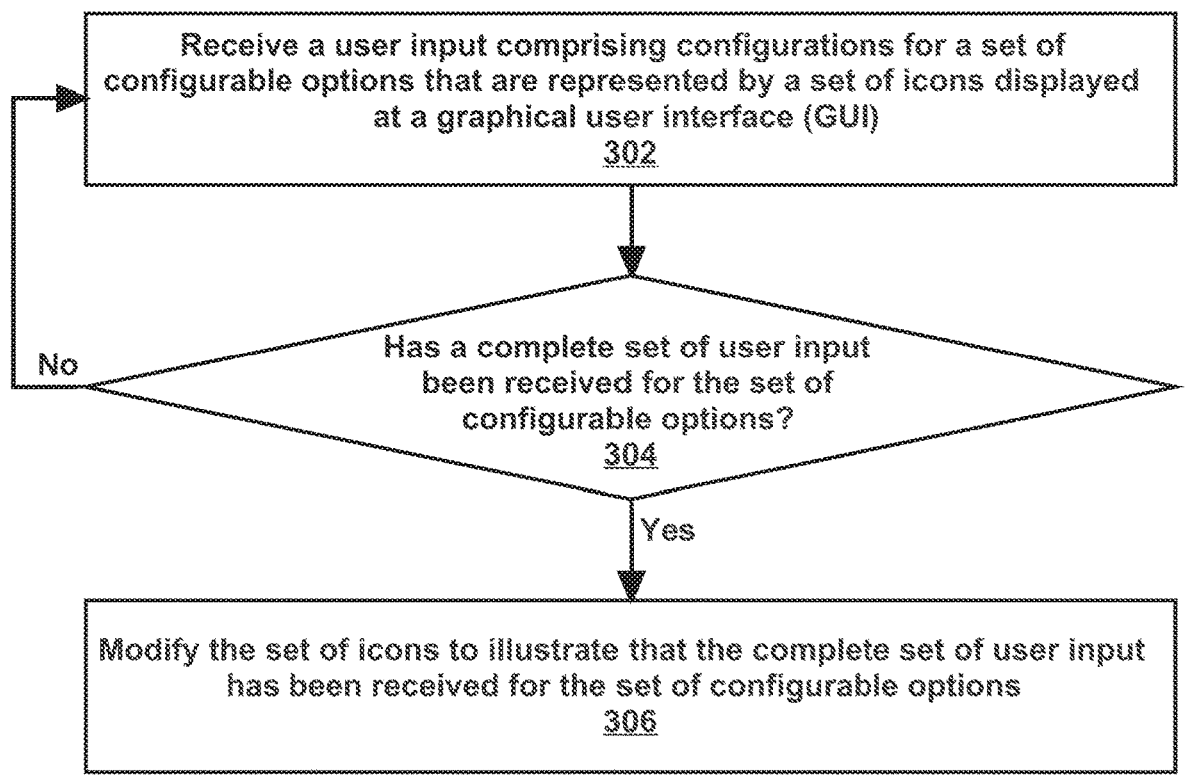
FIG. 3 illustrates an example set of operations for illustrating a completion of a configuration of a set of configurable options at a graphical user interface, in accordance with one or more embodiments.
Figure 4A:
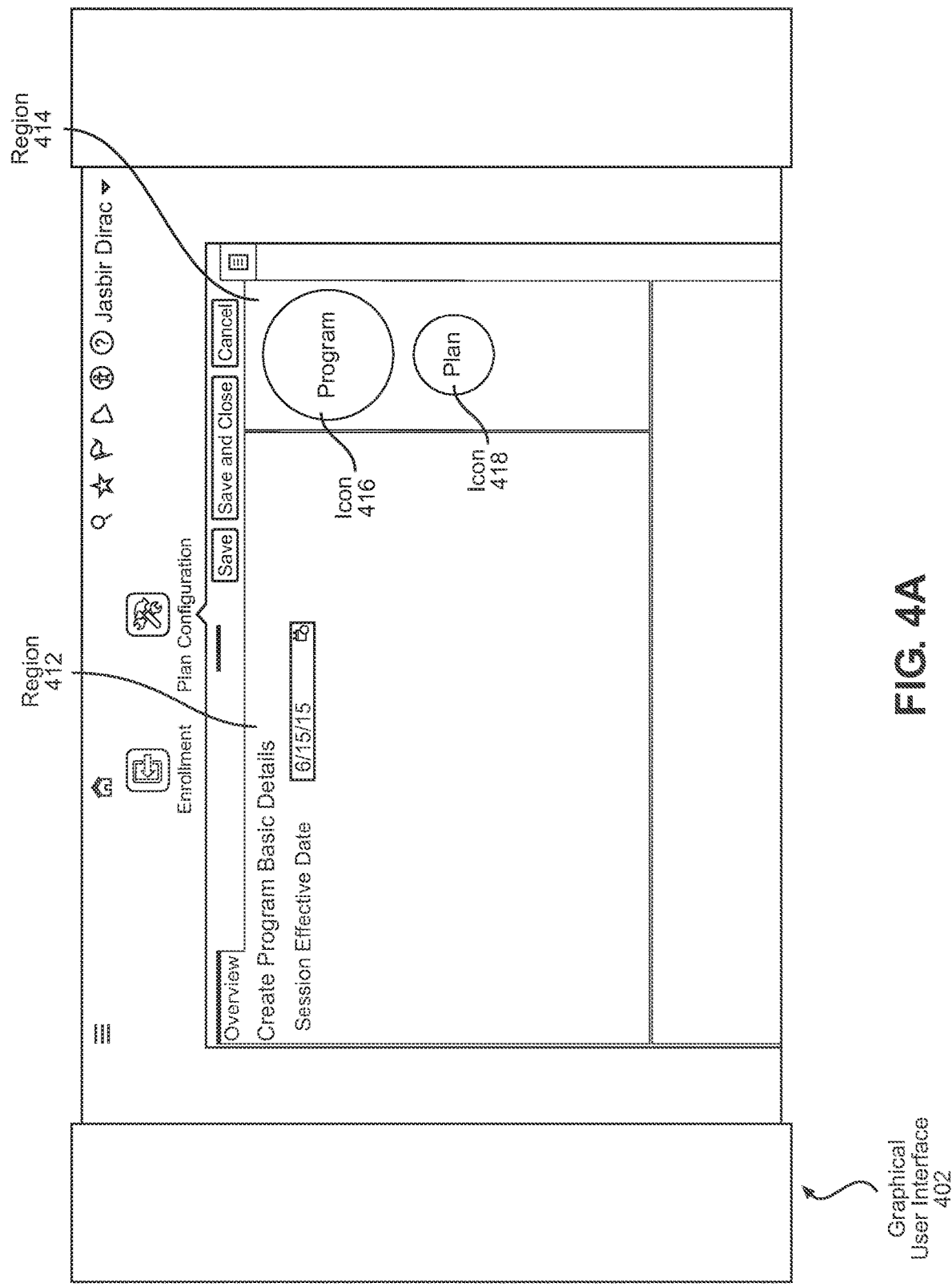
FIGS. 4A-4F illustrate an example set of screenshots of an interactive graphical user interface that guide configuration of an application, in accordance with one or more embodiments.
Figure 4B:
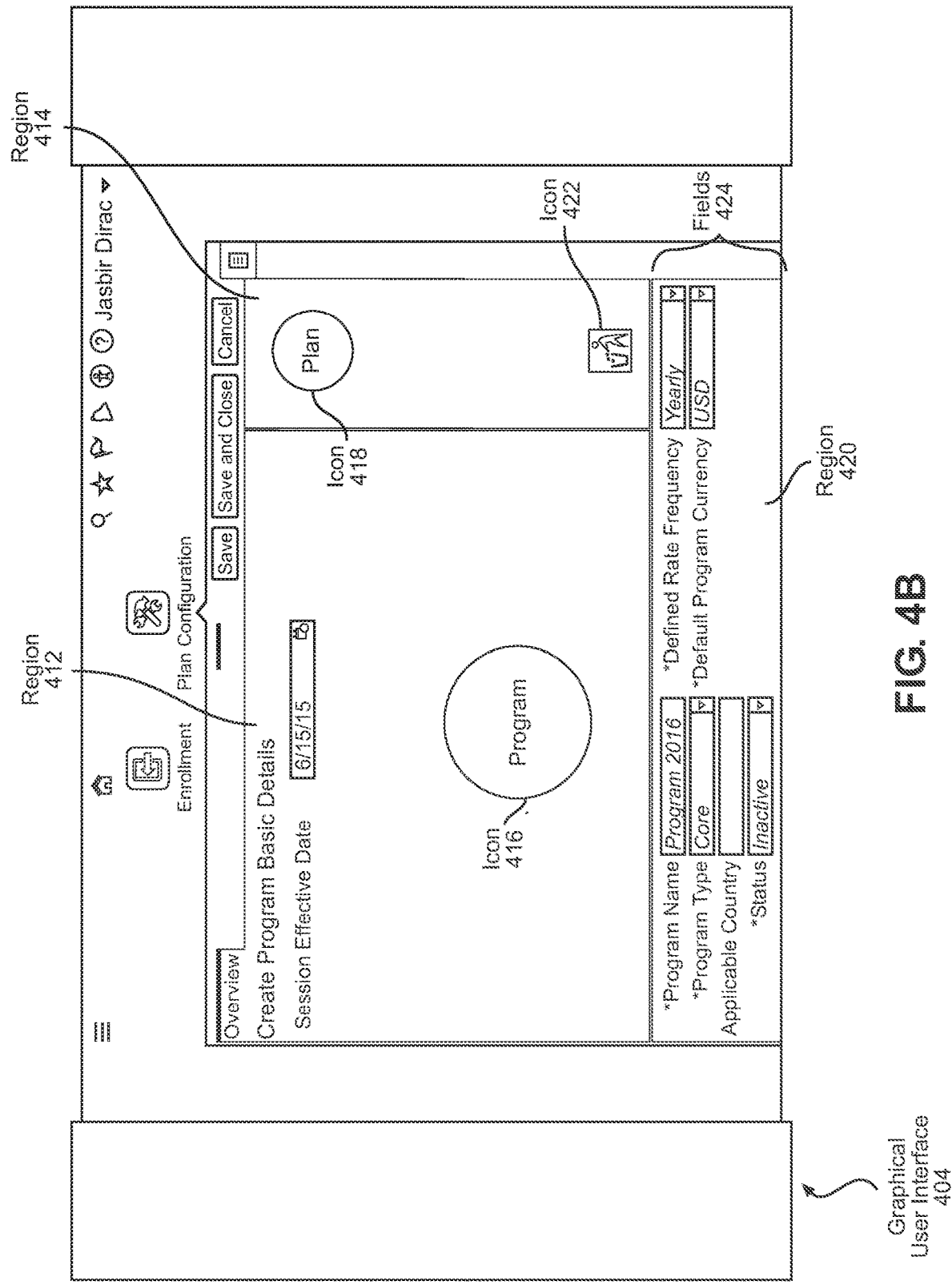
Figure 4C:
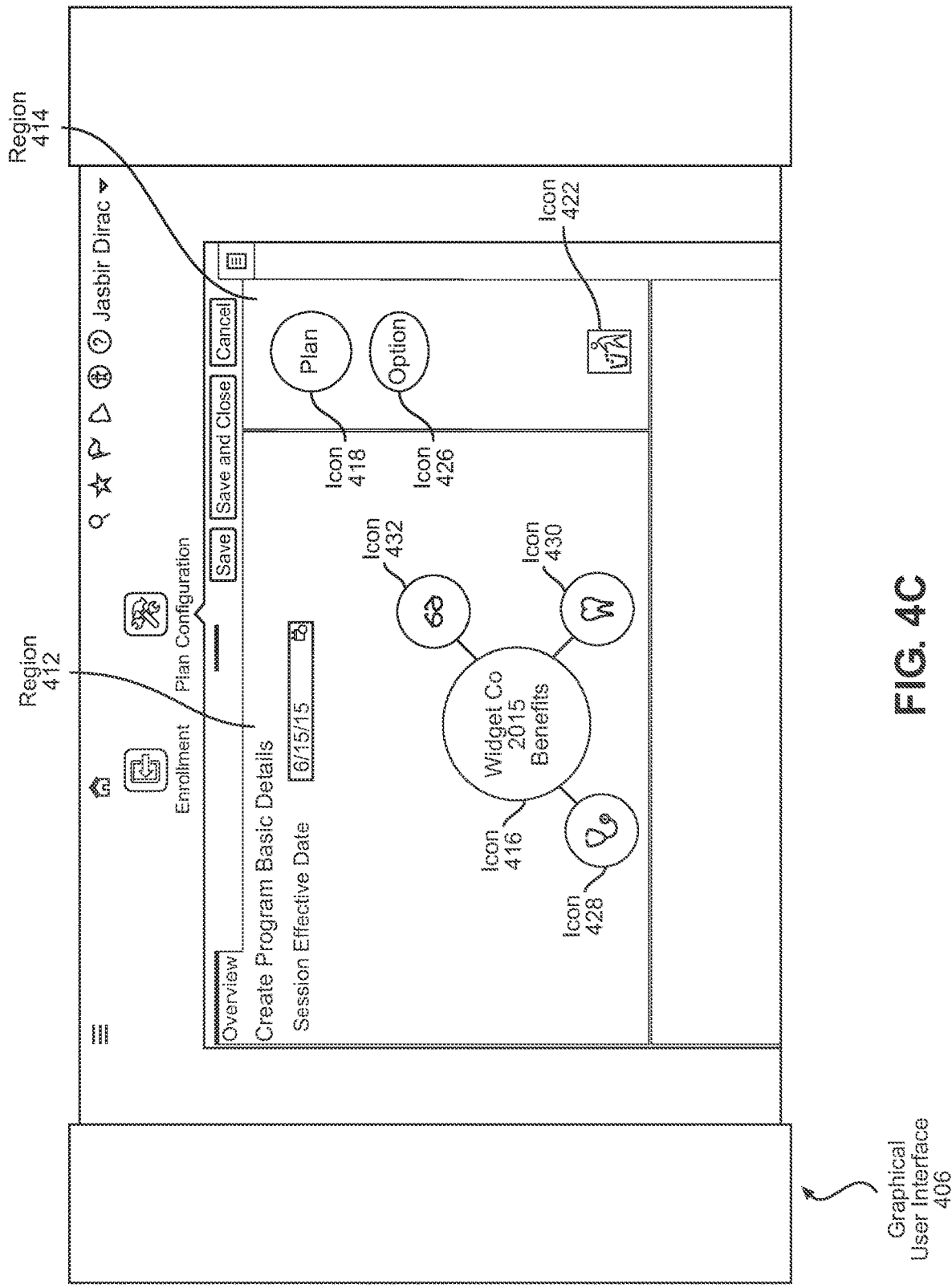
Figure 4D:
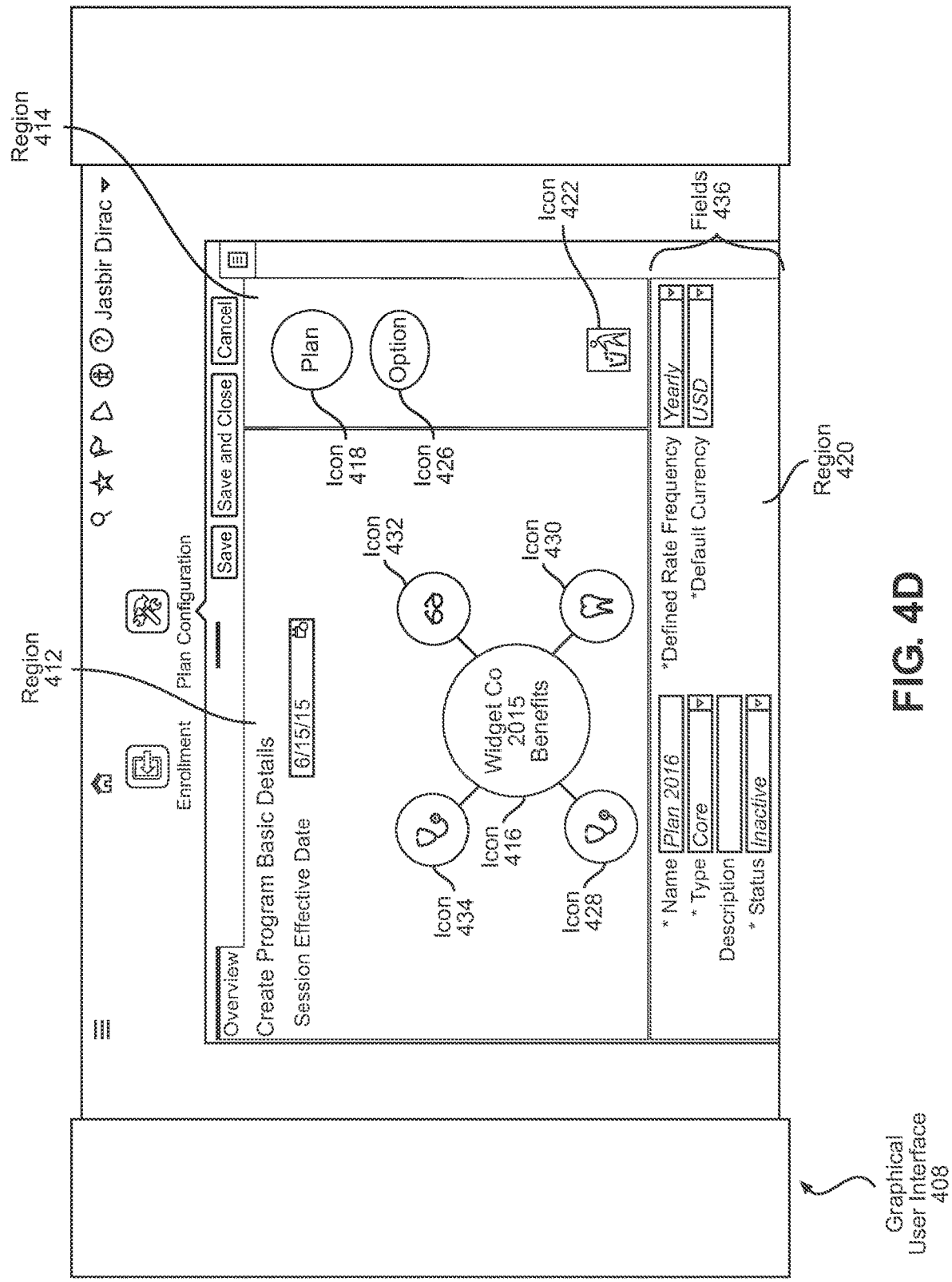
Figure 4E:
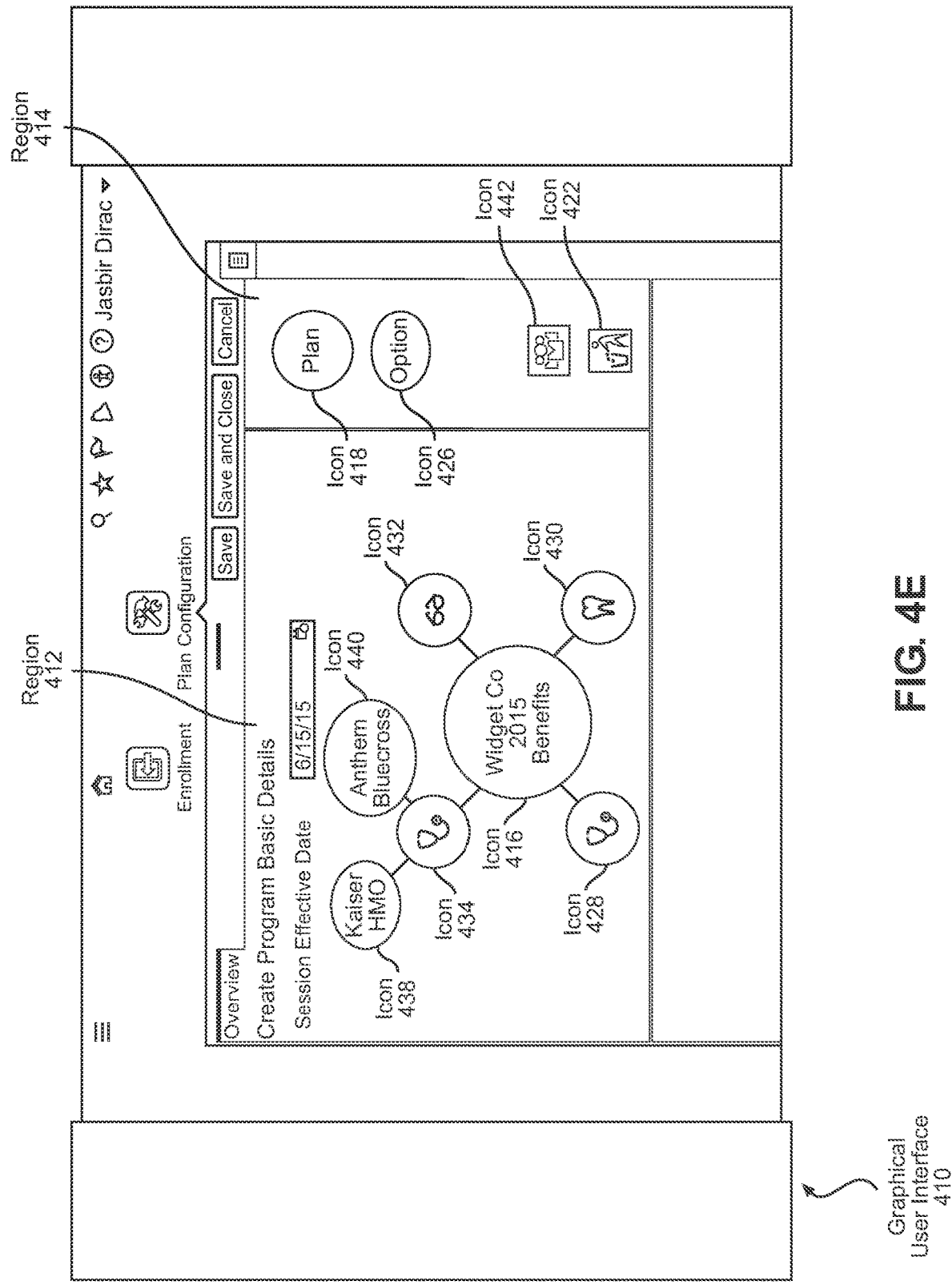
Figure 4F:
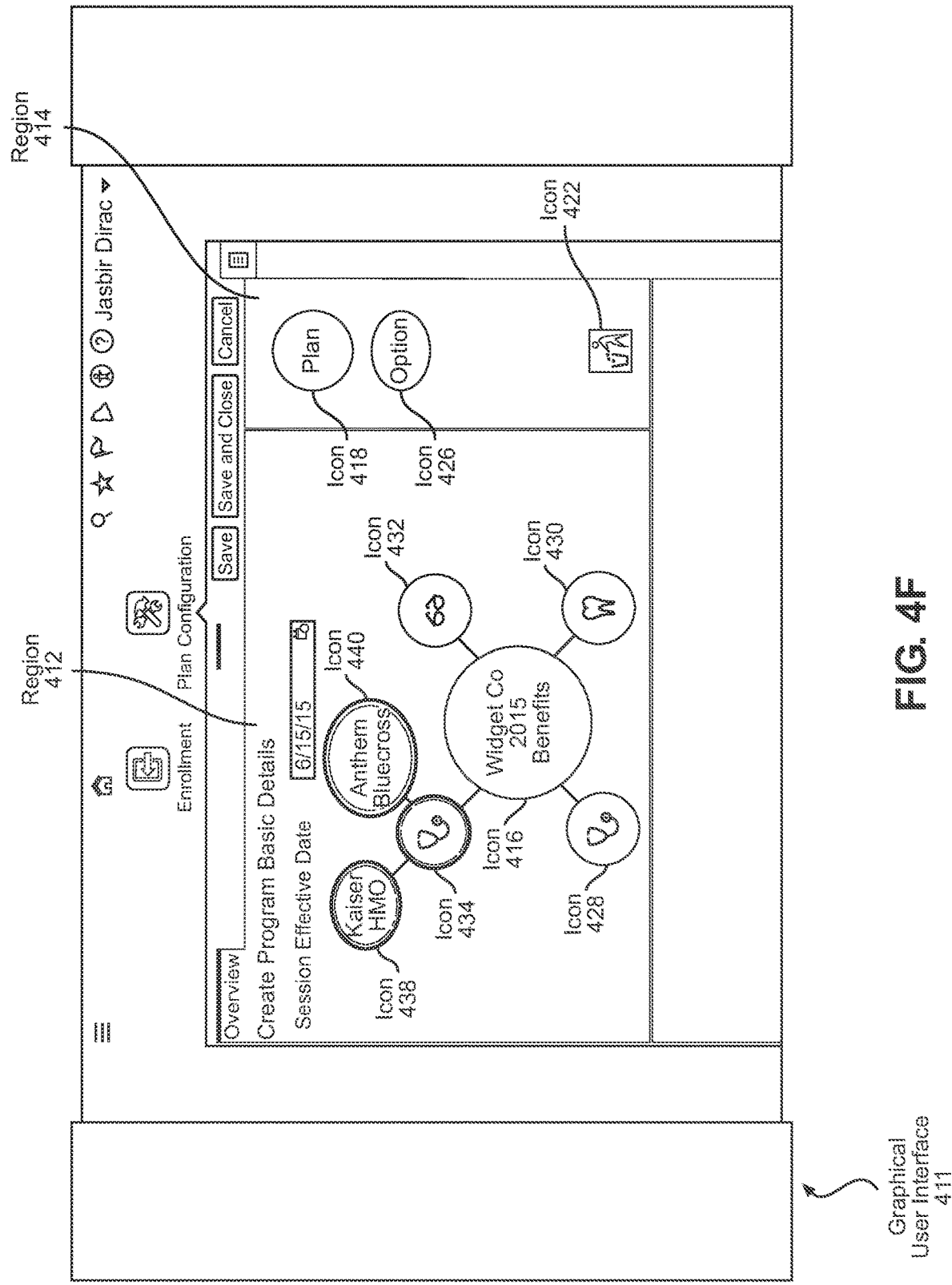

4. Illustrating a Completion of a Configuration of a Set of Configurable Options at a Graphical User Interface FIG. 3 illustrates an example set of operations for illustrating a completion of a configuration of a set of configurable options at a graphical user interface (GUI), in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments include receiving user input comprising configurations for a set of configurable options that are represented by a set of icons displayed at a graphical user interface (Operation 302). The GUI displays the set of icons in a configuration region of the GUI, indicating that the set of configurable options represented by the set of icons have been selected by the user. One or more interface elements, such as fields, accept user input comprising the configurations for the set of configurable options. The GUI displays the interface elements in response to a user input dragging the set of icons into the configuration region of the GUI. Alternatively, the GUI displays the interface elements in response to a user input clicking on one or more of the set of icons, after the set of icons were dragged into the configuration region of the GUI.

The interface elements displayed at the GUI may correspond to one or more attributes of the set of configurable options. As an example, an icon representing Benefits Program may be dragged into a configuration region of a GUI. An attribute of Benefits Program may be an applicable country of the Benefits Program. Upon the icon being dropped into the configuration region, the GUI may display a particular interface element corresponding to the attribute. The particular interface element may be a dropdown menu for selecting a country in which the Benefits Program is applicable.

A user may use a user input device to enter the configuration using the interface elements displayed at the GUI. The user may, for example, use a mouse to make a selection from a dropdown menu, or use a keyboard to enter text in a text field.

One or more embodiments include determining whether a complete set of user input has been received for the set of configurable options (Operation 304). Determining whether a complete set of user input has been received for a particular configurable option may include: (a) determining whether attributes of the particular configurable option are configured and/or (b) determining whether configurable options associated with a particular configuration option are configured.

Certain attributes of a configurable option may be "required" to be configured, while other attributes of the configurable option may be "optional." Whether an attribute is "required" or "optional" is indicated by attributes of the configurable option that are stored in a data repository. A complete set of user input is determined to be received for a configurable option if all required attributes of the configurable option have been configured.

As an example, attributes of the configurable option Benefits Program may include, for example, "Reference Number of Program" and "Name of Program." "Reference Number of Program" may be stored as a required attribute, because the reference number is used across different departments of a corporation to uniquely identify a particular program of interest. "Name of Program" may be stored as an optional attribute, because the name is used merely as a convenient reference to the program. Configuration of Benefits Program would be determined to be complete if user input was received for "Reference Number of Program," regardless of whether user input was received for "Name of Program."

Certain configurable options may be "required" to be configured (also referred to herein as "required configurable options") if a particular configurable option was previously selected. Configuration of the particular configurable option is not considered complete until the required configurable options are also configured. The required configurable options associated with the particular configurable option are identified from a data repository storing associations between various configurable options. A complete set of user input is determined to be received for a configurable option if all required configurable options associated with the configurable option have been configured.

As an example, a benefits application may include the configurable options: (a) Provider A Option, and (b) Eligibility Criteria. Eligibility Criteria may be a configurable option that indicates which employees are eligible to participate in a particular benefits option. The application may require that Eligibility Criteria be configured for each selected benefits option. Eligibility Criteria may be stored, in a data repository, as a required configurable option associated with the configurable option, Provider A Option. Configuration of Provider A Option would be determined to be complete if user input comprising a configuration for an associated Eligibility Criteria were received.

Determining whether a complete set of user input has been received for the set of configurable options may include determining a number of configurable options in the set of configurable options. The number of configurable options in the set of configurable options may be determined based on a prior selection and/or configuration of another configurable option. If the number of configurable options that have received a complete configuration is the same as the number of configurable options in the set of configurable options, then receipt of a complete set of user input for the set of configurable options is determined.

As an example, a user may select a particular configurable option, which is Vehicle. The user may select another configurable option, which is Wheels. An attribute of Wheels is the number of wheels on the vehicle. The user may enter that there are two wheels on the vehicle. Based on the user input, a set of configurable options that are suggested for the user to configure includes two configurable options, Front Wheel and Back Wheel. The user may specify the required attributes of Front Wheel and the required attributes of Back Wheel. Since there are two configurable options in the set of configurable options that are suggested for the user to configure, and configuration of each of the two configurable options is complete, receipt of a complete set of user input for the set of configurable options is determined.

In one or more embodiments, if a complete set of user input has not been received for the set of configurable options, then the GUI continues to receive user input comprising configurations for the set of configurable options (Operation 302). The GUI continues to accept user input until a complete set of user input is received.

In one or more embodiments, if a complete set of user input has been received for the set of configurable options, then the GUI modifies the set of icons to illustrate that the complete set of user input has been received for the set of configurable options (Operation 306). The GUI modifies and displays one or more visual and/or graphical aspects of the set of icons. Examples of visual and/or graphical aspects of an icon include a color of an icon, a shape of an icon, a tag, mark, or annotation of an icon, an image associated with the icon, and an animation associated with an icon. For example, an icon may be modified to change from one color to another color. As another example, an icon may be marked with a checkmark and/or the text "Done."

5. Example Embodiment

Detailed examples are described below for purposes of clarity. Components and/or operations described below should be understood as specific examples which may not be applicable to certain embodiments. Accordingly, components and/or operations described below should not be construed as limiting the scope of any of the claims. FIGS. 4A-4F illustrate an example set of screenshots of an interactive graphical user interface (GUI) that guide configuration of an application, in accordance with one or more embodiments.

An example graphical user interface (GUI) for configuring a benefits program for employees of a corporation is described. Initially, GUI 402 is rendered at a display device. Region 412 and region 414 are displayed at GUI 402. Region 412 is a main region of GUI 402 and encloses icons that have been selected by a user. Region 414 encloses icons that are available for a user to select. As illustrated, region 414 encloses icon 416 and icon 418. Icon 416 represents a configurable option, Program. Icon 418 represents another configurable option, Plan.

A user drags icon 416 from region 414 to region 412, and GUI 404 is rendered at the display device. By dragging icon 416 into region 412, the user has selected the configurable option, Program. Icon 416 is removed from region 414 because the configurable option Program may only be selected once. Icon 418 remains in region 414 and remains available for user selection. An additional icon 422 is displayed in region 414. Icon 422 represents a garbage bin for removing previously selected icons. For example, a user may drag a particular icon from region 412 to icon 422, in order to remove a previous selection of the particular icon. After removing the particular icon, the configurable option represented by the particular icon would not be configured by the user.

Based on the user's selection of icon 416, region 420 is also displayed at GUI 404. Region 420 encloses fields 424 that accept user input for configuring the configurable option, Program. Fields 424 include, for example, a text box for accepting a "Program Name" of Program, and a text box for accepting an "Applicable Country" of Program. The user configures Program by indicating that the benefits program is applicable to the United States.

Based on the user's selection and configuration of the configurable option, Program (represented by icon 416), GUI 406 is rendered at the display device. The user's selection and configuration of Program provides a context for identifying and/or suggesting additional configurable options, such as particular types of Plans, that are available for a user to configure. Plans that are associated with Program include: (a) Health Plan, (b) Dental Plan, (c) Vision Plan, (d) Childcare Vouchers, and (e) Pensions. However, best practices in the United States provide that only a subset of those Plans are typically offered: (a) Health Plan, (b) Dental Plan, and (c) Vision Plan. A set of rules stored in a database indicates that if a Program is configured to be applied in the United States, then (a) Health Plan, (b) Dental Plan, and (c) Vision Plan are suggested for a user to configure, while the remaining Plans that are associated with Program are not suggested.

By applying the context to the set of rules, the following configurable options are suggested for a user to configure: (a) Health Plan, (b) Dental Plan, and (c) Vision Plan. Icon 428 representing the configurable option, Health Plan, is displayed at region 412. Icon 428 includes an image of a stethoscope. Icon 430 representing the configurable option, Dental Plan, is displayed at region 412. Icon 430 includes an image of a tooth. Icon 432 representing the configurable option, Vision Plan, is displayed at region 412. Icon 432 includes an image of a pair of eyeglasses. By displaying icons 428-432 in region 412 (which is a region for enclosing selected icons), icons 428-432 are suggested for a user to configure.

A visualization of associations between Program, Health Plan, Dental Plan, and Vision Plan is displayed. A hierarchy of associations indicates that Program is on a particular level of the hierarchy, while Health Plan, Dental Plan, and Vision Plan are on a level that is below the particular level. The hierarchy of associations also indicates that Program is associated with each of Health Plan, Dental Plan, and Vision Plan. The hierarchy of associations is visualized as a spokes-and-wheel graph. Program is represented by a central icon 416. Health Plan, Dental Plan, and Vision Plan are represented by icons 428-432 placed in a circle surrounding icon 416. A line (also referred to herein as a spoke) connects icon 428 and icon 416. Another line connects icon 430 and icon 416. Another line connects icon 432 and icon 416.

Meanwhile, icon 418 representing Plan remains displayed at region 414. A user may drag icon 418 into region 412, in order to select configurable options in addition to the ones that have been suggested based on the context.

In addition, icon 426 representing Option is displayed at region 414. Based on the suggestion to configure the configurable options, (a) Health Plan, (b) Dental Plan, and (c) Vision Plan, other configurable options have become available for a user to configure. In particular, the configurable option, Option, is available for a user to configure. Icon 426 representing Option may be dragged into region 412.

A user drags an additional icon 434, representing another Health Plan, from region 414 into region 412, and GUI 408 is rendered at the display device. Based on the user's selection of icon 434, region 420 is also displayed at GUI 408. Region 420 encloses fields 436 that accept user input for configuring the newly selected Health Plan configurable option. Fields 436 include, for example, a text box for accepting a "Name" of the Health Plan, and another text box for accepting a number of Options, for the Health Plan, to be provided to the employees. The user configures the Health Plan by naming the plan as "Plan 2016." The user specifies that there are two Options for the Health Plan.

A user drags icon 438 and icon 440, representing Option A and Option B, into region 412, and GUI 410 is rendered at the display device. The user may drag icon 438 and icon 440 over icon 434, to indicate that Option A and Option B are associated with the Health Plan represented by icon 434. The associations are indicated by a line between icon 438 and icon 434, and another line between icon 440 and icon 434. The user configures Option A by naming the option as "Kaiser HMO." The user configures Option B by naming the option as "Anthem Bluecross." The user specifies all required attributes of Option A and Option B and provides a complete configuration for each.

Based on the user's configuration of the Health Plan represented by icon 434, there are two Options for the Health Plan. The Health Plan, and the two Options for the Health Plan, are classified as a particular set of configurable options. An inquiry is made as to whether the two Options have each been completely configured. Since all required fields of Option A and Option B have been received, a complete set of user input for the set of configurable options is determined to have been received.

Based on the completion of the configurations for the set of configurable options represented by icon 434, icon 438, and icon 440, GUI 411 is rendered at the display device. As illustrated, icon 434, icon 438, and icon 440 are modified to indicate that the complete set of user input for the set of configurable options has been received. The color of icon 434, icon 438, and icon 440 is modified, for example, from blue to green.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
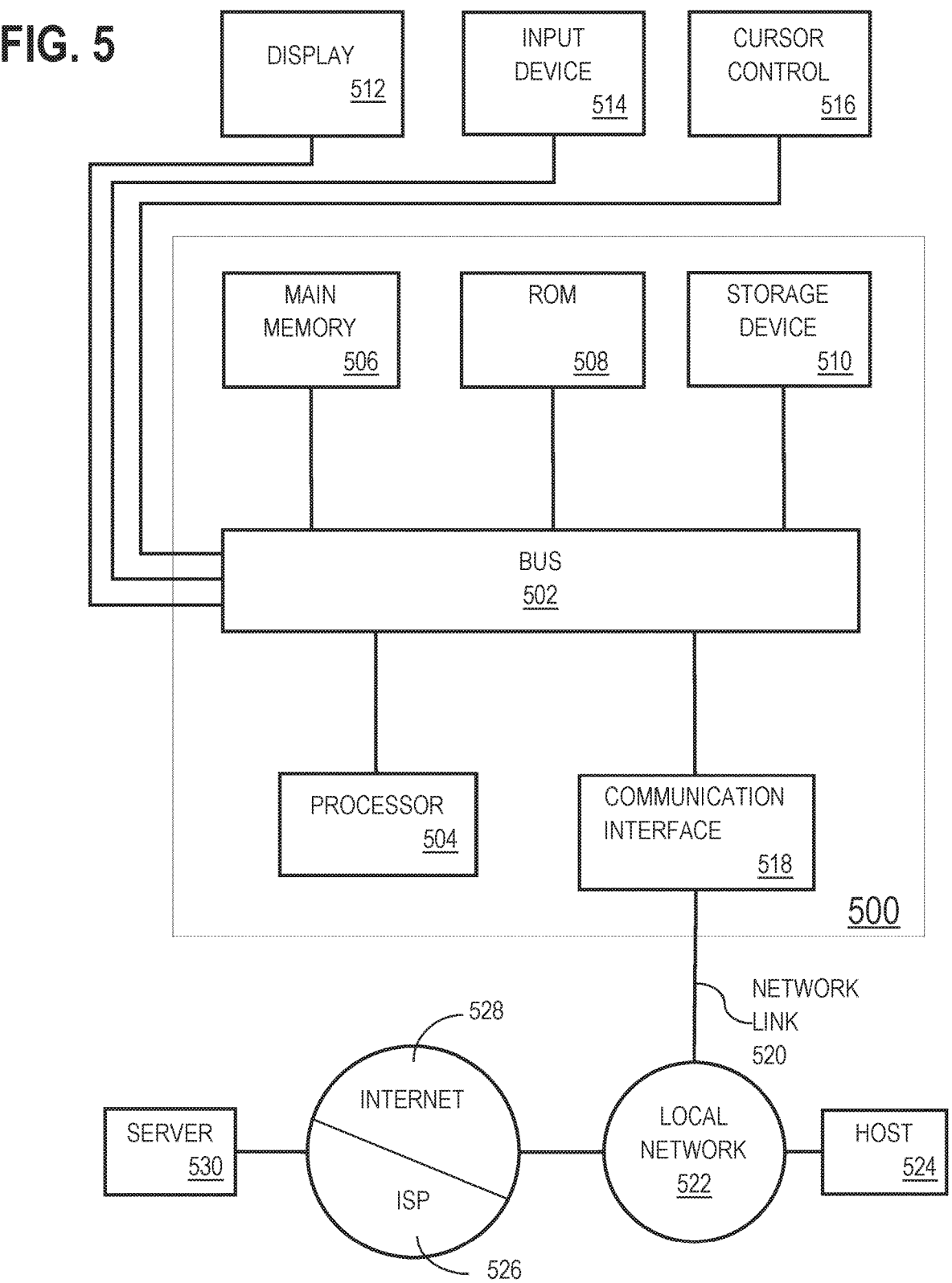
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:

presenting, on a graphical user interface (GUI), a first icon representing a first configurable option;

presenting, on the GUI, a second icon representing a second configurable option associated with the first configurable option and a third icon representing a third configurable option associated with the first configurable option;

determining that a complete configuration of the first configurable option requires specification of a first attribute of the second configurable option and specification of a second attribute of the third configurable option;

responsive to receiving a second user input comprising specification of the first attribute of the second configurable option, without any specification of the second attribute of the third configurable option: refraining from modifying any of the first icon, the second icon, and the third icon to indicate that the complete configuration of the first configurable option has been received; and subsequent to receiving the second user input:
responsive to receiving a third user input comprising specification of the second attribute of the third configurable option: modifying the first icon, the second icon, and the third icon to indicate that the complete configuration of the first configurable option has been received.

2. The one or more non-transitory machine-readable media of claim 1, wherein:
a data repository stores information indicating a hierarchy of associations between a plurality of configurable options, and the hierarchy of associations indicates that the second configurable option, the third configurable option, and a fourth configurable option are descendants of the first configurable option;
determining that the complete configuration of the first configurable option requires specification of the first attribute of the second configurable option and specification of the second attribute of the third configurable option comprises:
receiving a fourth user input comprising specification of a third attribute of the first configurable option;
based on the third attribute of the first configurable option: selecting the second configurable option and the third configurable option as required configurable options associated with the first configurable option, without selecting the fourth configurable option as a required configurable option associated with the first configurable option.

3. The one or more non-transitory machine-readable media of claim 1, wherein determining that the complete configuration of the first configurable option requires specification of the first attribute of the second configurable option and specification of the second attribute of the third configurable option comprises:
determining that a third attribute of the first configurable option indicates a number of configurable options associated with the first configurable option, wherein the number of configurable options is equal to or greater than two.

4. The one or more non-transitory machine-readable media of claim 3, further storing instructions which, when executed by the one or more processors, cause:
prior to determining that the complete configuration of the first configurable option requires specification of the first attribute of the second configurable option and specification of the second attribute of the third configurable option:
receiving a fourth user input comprising specification of the third attribute of the first configurable option.

5. The one or more non-transitory machine-readable media of claim 1 further storing instructions which, when executed by the one or more processors, cause:
determining that the complete configuration of the first configurable option does not require specification of a third attribute of a fourth configurable option;
wherein a data repository stores information indicating that the second configurable option and the third configurable option are required configurable options associated with the first configurable option, and the fourth configurable option is an optional configurable option associated with the first configurable option.

6. The one or more non-transitory machine-readable media of claim 1 further storing instructions which, when executed by the one or more processors, cause:
determining that the complete configuration of the first configurable option further requires specification of a third attribute of the first configurable option and specification of a fourth attribute of the first configurable option, but does not require specification of a fifth attribute of the first configurable option;
wherein a data repository stores information indicating that the third attribute and the fourth attribute are required attributes associated with the first configurable option, and the fifth attribute is an optional attribute associated with the first configurable option.

7. The one or more non-transitory machine-readable media of claim 6, wherein modifying the first icon, the second icon, and the third icon to indicate that the complete configuration of the first configurable option has been received is further responsive to receiving a fourth user input comprising specification of the third attribute of the first configurable option and specification of the fourth attribute of the first configurable option.

8. The one or more non-transitory machine-readable media of claim 1, wherein a data repository stores information indicating a hierarchy of associations between a plurality of configurable options, and the hierarchy of associations indicates that the second configurable option and the third configurable option are descendants of the first configurable option.

9. The one or more non-transitory machine-readable media of claim 1, wherein modifying the first icon, the second icon, and the third icon to indicate that the complete configuration of the first configurable option has been received comprises modifying at least one of:
a color associated with the first icon;
a shape associated with the first icon;
an annotation associated with the first icon;
an image associated with the first icon; and
an animation associated with the first icon.

10. A system, comprising:
at least one device including a hardware processor; and
the system being configured to perform operations comprising:
presenting, on a graphical user interface (GUI), a first icon representing a first configurable option;
presenting, on the GUI, a second icon representing a second configurable option associated with the first configurable option and a third icon representing a third configurable option associated with the first configurable option;

determining that a complete configuration of the first configurable option requires specification of a first attribute of the second configurable option and specification of a second attribute of the third configurable option;
responsive to receiving a second user input comprising specification of the first attribute of the second configurable option, without any specification of the second attribute of the third configurable option: refraining from modifying any of the first icon, the second icon, and the third icon to indicate that the complete configuration of the first configurable option has been received; and
subsequent to receiving the second user input:
responsive to receiving a third user input comprising specification of the second attribute of the third configurable option: modifying the first icon, the second icon, and the third icon to indicate that the complete configuration of the first configurable option has been received.

11. The system of claim 10, wherein:
a data repository stores information indicating a hierarchy of associations between a plurality of configurable options, and the hierarchy of associations indicates that the second configurable option, the third configurable option, and a fourth configurable option are descendants of the first configurable option;
determining that the complete configuration of the first configurable option requires specification of the first attribute of the second configurable option and specification of the second attribute of the third configurable option comprises:
receiving a fourth user input comprising specification of a third attribute of the first configurable option;
based on the third attribute of the first configurable option: selecting the second configurable option and the third configurable option as required configurable options associated with the first configurable option, without selecting the fourth configurable option as a required configurable option associated with the first configurable option.

12. The system of claim 10, wherein determining that the complete configuration of the first configurable option requires specification of the first attribute of the second configurable option and specification of the second attribute of the third configurable option comprises:
determining that a third attribute of the first configurable option indicates a number of configurable options associated with the first configurable option, wherein the number of configurable options is equal to or greater than two.

13. The system of claim 12, wherein the operations further comprise:
prior to determining that the complete configuration of the first configurable option requires specification of the first attribute of the second configurable option and specification of the second attribute of the third configurable option:
receiving a fourth user input comprising specification of the third attribute of the first configurable option.

14. The system of claim 10, wherein the operations further comprise:
determining that the complete configuration of the first configurable option does not require specification of a third attribute of a fourth configurable option;
wherein a data repository stores information indicating that the second configurable option and the third configurable option are required configurable options associated with the first configurable option, and the fourth configurable option is an optional configurable option associated with the first configurable option.

15. The system of claim 10, wherein the operations further comprise:
determining that the complete configuration of the first configurable option further requires specification of a third attribute of the first configurable option and specification of a fourth attribute of the first configurable option, but does not require specification of a fifth attribute of the first configurable option;
wherein a data repository stores information indicating that the third attribute and the fourth attribute are required attributes associated with the first configurable option, and the fifth attribute is an optional attribute associated with the first configurable option.

16. The system of claim 15, wherein modifying the first icon, the second icon, and the third icon to indicate that the complete configuration of the first configurable option has been received is further responsive to receiving a fourth user input comprising specification of the third attribute of the first configurable option and specification of the fourth attribute of the first configurable option.

17. A method comprising:
presenting, on a graphical user interface (GUI), a first icon representing a first configurable option;
presenting, on the GUI, a second icon representing a second configurable option associated with the first configurable option and a third icon representing a third configurable option associated with the first configurable option;
determining that a complete configuration of the first configurable option requires specification of a first attribute of the second configurable option and specification of a second attribute of the third configurable option;
responsive to receiving a second user input comprising specification of the first attribute of the second configurable option, without any specification of the second attribute of the third configurable option: refraining from modifying any of the first icon, the second icon, and the third icon to indicate that the complete configuration of the first configurable option has been received; and
subsequent to receiving the second user input:
responsive to receiving a third user input comprising specification of the second attribute of the third configurable option: modifying the first icon, the second icon, and the third icon to indicate that the complete configuration of the first configurable option has been received;
wherein the method is performed by at least one device including a hardware processor.

18. The method of claim 17, wherein:
a data repository stores information indicating a hierarchy of associations between a plurality of configurable options, and the hierarchy of associations indicates that the second configurable option, the third configurable option, and a fourth configurable option are descendants of the first configurable option;
determining that the complete configuration of the first configurable option requires specification of the first attribute of the second configurable option and specification of the second attribute of the third configurable option comprises:

receiving a fourth user input comprising specification of a third attribute of the first configurable option;

based on the third attribute of the first configurable option: selecting the second configurable option and the third configurable option as required configurable options associated with the first configurable option, without selecting the fourth configurable option as a required configurable option associated with the first configurable option.

19. The method of 17, wherein determining that the complete configuration of the first configurable option requires specification of the first attribute of the second configurable option and specification of the second attribute of the third configurable option comprises:

determining that a third attribute of the first configurable option indicates a number of configurable options associated with the first configurable option, wherein the number of configurable options is equal to or greater than two.

20. The method of claim 19, further comprising:

prior to determining that the complete configuration of the first configurable option requires specification of the first attribute of the second configurable option and specification of the second attribute of the third configurable option:

receiving a fourth user input comprising specification of the third attribute of the first configurable option.

* * * * *

UNITED STATES PATENT AND TRADEMARK OFFICE
CERTIFICATE OF CORRECTION

PATENT NO. : 10,656,786 B2
APPLICATION NO. : 16/232843
DATED : May 19, 2020
INVENTOR(S) : Raffo et al.

Page 1 of 1

It is certified that error appears in the above-identified patent and that said Letters Patent is hereby corrected as shown below:

In the Claims

In Column 21, Line 10, in Claim 19, after "of" insert -- claim --.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*